(12) United States Patent
Direen, Jr. et al.

(10) Patent No.: US 6,934,730 B2
(45) Date of Patent: *Aug. 23, 2005

(54) METHOD AND SYSTEM FOR GENERATING A TRANSFORM

(75) Inventors: Harry George Direen, Jr., Colorado Springs, CO (US); Christopher Lockton Brandin, Colorado Springs, CO (US)

(73) Assignee: Xpriori, LLC, Colorado Springs, CO (US)

( * ) Notice: Subject to any disclaimer, the term of this patent is extended or adjusted under 35 U.S.C. 154(b) by 656 days.

This patent is subject to a terminal disclaimer.

(21) Appl. No.: 09/977,268

(22) Filed: Oct. 12, 2001

(65) Prior Publication Data

US 2002/0069232 A1 Jun. 6, 2002

Related U.S. Application Data

(60) Provisional application No. 60/240,578, filed on Oct. 13, 2000.

(51) Int. Cl.[7] ............................ G06F 1/02; H03M 13/00
(52) U.S. Cl. ..................... 708/250; 714/759; 714/781
(58) Field of Search .................. 708/250, 252, 708/256, 491; 714/781, 758, 759, 784, 785

(56) References Cited

U.S. PATENT DOCUMENTS

| | | | | |
|---|---|---|---|---|
| 5,619,516 A | * | 4/1997 | Li et al. | 714/807 |
| 5,715,258 A | * | 2/1998 | Ikeda et al. | 714/759 |
| 6,195,780 B1 | * | 2/2001 | Dravida et al. | 714/758 |
| 6,360,348 B1 | * | 3/2002 | Yang | 714/784 |

* cited by examiner

*Primary Examiner*—Chuong D Ngo
(74) *Attorney, Agent, or Firm*—Law Office of Dale B. Halling

(57) ABSTRACT

A system (10) for generating a transform includes a first transform lookup table (12) and second transform lookup table (28). A transform exclusive OR array (26) is connected to an output (24) of the first transform lookup table (12) and an output (32) of the second transform lookup table (28). The system (10) allows transforms (polynomial codes, CRCs) to be generated using two or more tables.

9 Claims, 8 Drawing Sheets

Icon Transform Table 1
Table values are in hexadecimal

```
  0 -   3                    0   3434074F4C76EED0   68680E9E98EDDDA0   5C5C09D1D49B3370
  4 -   7   D0D01D3D31DBBB40   B4E41A727DAD5590   B8B813A3A93666E0   8C8C14ECE5408830
  8 -  11   A39CA937B07EF3CF   97A8AE78FC081D1F   CBF4A7A928932E6F   FFC0A0B664E5C0BF
 12 -  15   734CB40A81A5488F   4778B345CDD3A65F   1B24BA941948952F   2F10BDDB553E7BFF
 16 -  19   4505C22B33462D1    7131C66DFF428C01   2D6DCFBC2BD9BF71   1959C8F367AF51A1
 20 -  23   95D5DC1F82BFD991   A1E1DB50CE993741   FDBDD2811A020431   C989D5CE5674EAE1
 24 -  27   E6996815034A911E   D2AD6F5A4F3C7FCE   8EF1668B9BA74CBE   BAC561C4D7D1A26E
 28 -  31   3649752832912A5B    27D72677EE7C48E   5E217BB6AA7CF7FE   6A157CF9E60A192E
 32 -  35   8A0B82456668C5A2   BE3F850A2A1E2B72   E2638CDBFE851802   D6578B94B2F3F6D2
 36 -  39   5ADB9F7857B37EE2   6EEF98371BC59032   32B391E6CF5EA342   68796A983284D92
 40 -  43   29972B72D616366D   1DA32C3D9A60D8BD   41FF25EC4EFBEBCD   75CB22A3028D051D
 44 -  47   F947364FE7CD8D2D   CD733100ABBB63FD   912F38D17F20508D   A51B3F9E3356BE5D
 48 -  51   CF0E4367D55CA773   FB3A4428992A49A3   A7664DF94DB17AD3   93524AB601C79403
 52 -  55   1FDB5E5AE4871C33   2BEA5915A8F1F2E3   77B650C47C6AC193   4382578B301C2F43
 56 -  59   6C92BA50652254BC   58A6BD1F2954BA6C    4FAE4CBFDCPB91C   30CEB381B1B967CC
 60 -  63   BC42F76D54F9EFFC   8876F022188F012C   D42AF9F3CC14325C   E01EFEBC8062DC8C
 64 -  67   162B97C71F180E0B   221F9088536EE0DB   7E43995987F5D3AB   4A779E16CB833D7B
 68 -  71   C6FB8AFA2EC3B54B   P2CF8DB562B55B9B   AE938464B62E68EB   9AA7832BFA58863B
 72 -  75   B5B73EF0AF66FDC4   818339BFE3101314   DDDF306E378B2064   E9EB37217BFDCEB4
 76 -  79   656723CD9EBD4684   51532482D2CBA854   D0F2D5306509B24    393B2A1C4A2675F4
 80 -  83   532E56E5AC2C6CDA   671A51AAE05A820A   3B46587B34C1B17A   F725F3478B75FAA
 84 -  87   83FE4BD89DF7D79A   B7CA4C97D181394A   EB964546051A0A3A   DFA24209496CE4EA
 88 -  91   F0B2FFD21C529F15   C486F89D502471C5   98DAF14C84BF42B5   ACEBF603C8C9AC65
 92 -  95   2062E2EF2D892455   1456B5A061FFCA85   480AEC71B564F9F5   7C3EEB3EF9121725
 96 -  99   9C2015827970CBA9   A81412CD35062579   F4481B1CE19D1609   C07C1C53ADEBF8D9
100 - 103   4CF008BF48AB70E9   78C40FF004DD9E39   24980621D046AD49   10AC016E9C304399
104 - 107   3FBCBCB5C90E3866   B88BBFA8578D6B6    57D4B22B51E3E5C6   63E0B5641D950B16
108 - 111   EF6CA188F8D58326   DB58A6C7B4A36DF6   8704AF1660385E86   B330A8592C4EB056
112 - 115   D925D4A0CA44A97B   ED11D3EF863247A8   B14DDA3E52A974D8   8579DD711EDF9A08
116 - 119    9F5C99DFB9F1238   3DC1CED2B7E9FCE8   619DC7036372CF9B   55A9C04C2F042148
120 - 123   7AB97D977A3A5AB7   4E8D7AD8364CB467   12D17309E2D78717   26E57446AEA169C7
124 - 127   AA6960AA4BB1E1F7   9E5D67E507970F27   C2016E34D30C3C57   F635697B9F7AD287
128 - 131   2C572F8E3E301C16   186328C17246F2C6   443F2110A6DDC1B6   700B265FEAAB2F66
132 - 135   FC8732B30FEBA756   C8B335FC439D4986   94BF3C2D97067AF6   A0DB3B62DB709426
136 - 139   8FCB86B98E4E8FD9   BBFF81F6C2380109   E7A3882716A33279   D3978F685AD5DCA9
140 - 143   5F1B9B84BF955499   6B2F9CCBF3E3BA49   3773951A27788939   34792556B0E67E9
144 - 147   6952EEAC8D047BC7   5D66E9E3C1729017    13AE0321539A367   350EE77D599F4DB7
148 - 151   B982F391BCDFC587   8DB6F4DEF0A92B57   D1EAFD0F24321827   E5DEFA406844F6F7
152 - 155   CACE479B3D7A8D08   FEFA40D4710C63D8   A2A64905A59750A8   96924B4AE9E1BE78
156 - 159   1A1E5AA60CA13648   2E2A5DE940D7D898   72765435E4E4CEBE8   46425377D83A0538
160 - 163   A65CADCB5858D9B4   9268AA84142B3764   CE34A355C0B50414   FA00A41A8CC3EAC4
164 - 167   768CB0F6698362F4   42B8B7B925F58C24   1EE4BE68F16EBF54   2AD0B927BD185184
168 - 171   5C004FCB8262A7B    31F403B3A450C4AB   6DA80A6270CBF7DB   599C0D2D3CBD190B
172 - 175   D51019C1D9FD913B   E1241E88958B7FEB   BD78175F41104C9B   894C10100D66A24B
176 - 179   E3596CE9EB6CBB65   D76D6BA6A71A55B5   8B316277738166C5   BF0565383FF78815
180 - 183   338971D4DAB70025    7BD769B96C1BEF5   5BE17F4A425ADD85   6FD578050E2C3355
184 - 187   40C5C5DE5B1248AA   74F1C2911764A67A   28ADCB40C3FF950A   1C99CC0F8F897BDA
188 - 191   9015D8E36AC9F3BA   A421DFAC26BF1D3A   F87DD67DF2242E4A   CC49D132BE52C09A
192 - 195   3A7CB8492128121D   E48BF066D5EFCCD    5214B6D7B9C5CFBD   6620B198F5B3216D
196 - 199   EAACA57410F3A95D   DE98A23B5C85478D   82C4ABEA881E74FD   B6F0ACA5C4689A2D
200 - 203   99E0117E9156E1D2   ADD41631DD200F02   F1881FE009BB3C72   C5BC18AF45CDD2A2
204 - 207   49300C43A08D5A92   7D040B0CECFBB442   215802DD38608732   156C0592741669E2
208 - 211   7F79796B92D1C70CC  4B4D7E24DE6A9E1C   171177F50AF1AD6C   232570BA468743BC
212 - 215   AFA96456A3C7CB8C   9B9D6319EFB1255C   C7C16AC83B2A162C   F3F56D87775CF8FC
216 - 219   DCE5D05C22628303   E8D1D7136E146DD3   B48DDEC2BA8F5EA3   80B9D98DF6F9B073
220 - 223    C35CD6113B93843   3801CA2E5FCFD693   645DC3FF8B54E5E3   5069C4B0C7220B33
224 - 227   B0773A0C4740D7BF   84433D430B36396F   D81F3492DFAD0A1F   EC2B33DD93DBE4CF
228 - 231   60A72731769B6CFF   5493207E3AED822F    8CF29AFEE76B15F   3CFB2EE0A2005F8F
232 - 235   13EB933BF73E2470   27DF9474BB48CAA0   7B839DA56FD3F9D0   4FB79AEA23A51700
236 - 239   C33B8E06C6E59F30   F70F89498A9371E0   AB5380985E084290   9F6787D7127EAC40
240 - 243   F572FB2EF474B56E   C146FC61B8025BBE   9D1AF5B06C9968CE   A92EF2FF20EF861E
244 - 247   25A2B613C5AF0B2E   1196E15C89D9E0FE   4DCAE88D5D42D3BE   79FEEFC211343D5E
248 - 251   56EE5219440A46A1   62DA556087CA871    3E865C87DCE79B01   AB25BC8909175D1
252 - 255   863E4F2475D1FDE1   B20A486B39A71331   EE5641BAED3C2041   DA6246F5A14ACE91
End of Table
```

FIG. 5

Icon Transform Table 2
Table values are in hexadecimal

```
  0 -   3                  0   5BAE5F1C7C60382C   B15CBE38F8C07058   E9F2E12484A04874
  4 -   7   6085EF3C224965FF   382BB0205E295DD3   D1D95104DA8915A7   89770E18A6E92D8B
  8 -  11   C10BDE784492CBFE   99A5816438F2F3D2   70576040BC52BBA6   28F93F5CC032838A
 12 -  15   A18E314466DBAE01   F9206E581ABB962D   10D28F7C9E1BDE59   487CD060B27BE675
 16 -  19   802B2FBD5AEC12B3   D88570A1268C2A9F   31779185A22C62EB   69D9CE99DE4C5AC7
 20 -  23   E0AEC08178A5774C   B8009F9D04C54F60   51F27EB980650714   95C21A5FC053F38
 24 -  27   4120F1C51B7ED94D   198BAED9621EE161   F07C4FFDE6BEA915   A8D210E19ADE9139
 28 -  31   21A51EF93C37BCB2   790B41E54057849E   90F9A0C1C4F7CCEA   C857FFDDB897F4C6
 32 -  35   26ACC376611A029    5AC4932B1A719805   B336720F9ED1D071   EB982D13E2B1E85D
 36 -  39   62EF230B4458C5D6   3A417C173838PDFA   D3B39D33BC98B58E   8B1DC22FC0F88DA2
 40 -  43   C361124F22836BD7   9BCF4D535EE353FB   723DAC77DA431B8F   2A93F36BA62323A3
 44 -  47   A3E4FD7300CA0E28   FB4AA26F7CAA3604   12B8434BF80A7E70   4A161C57846A465C
 48 -  51   8241E38A3CFDB29A   DAEFBC96409D8AB6   331D5DB2C43DC2C2   6BB302AEB85DFAEE
 52 -  55   E2C40CB61EB4D765   BA6A53AA62D4BF49   5398B28EE674A73D   B36ED929A149F11
 56 -  59   434A3DF2786F7964   1BB462EE040F4148   F21683CA80AF093C   AAB8DCD6FCCF3110
 60 -  63   23CFD2CE5A261C9B   7B618DD2264624B7   92936CF6A2E66CC3   CA3D33EADE8654EF
 64 -  67   4D5986BCC234052    5C7BC772B043787E   B589265634E3300A   ED27794A48830826
 68 -  71   64507752EB6A25AD   3CFB284E920A1D81   D50CC96A16AA55F5   8DA296766ACA6DD9
 72 -  75   C5DE461688B18BAC   9D70190AF4D1B380   7482F82E7071FBF4   2C2CA7320C11C3D8
 76 -  79   A55BA92AAAF8EE53   FDF5F636D698D67F   1407171252389E0B   4CA9480E2E58A627
 80 -  83   84FEB7D396CF52B1   DC50E8CFEAAF6ACD   35A209EB6E0F22B9   6D0C56F7126F1A95
 84 -  87   E47B58EFB486371E   BCD507F3CBE60F32   5527E6D74C464746   D89B9CB30267F6A
 88 -  91   45F569ABD25D991F   1D5B36B7AE3DA133   F4A9D7932A9DB947   AC07888F56FDD16B
 92 -  95   25708697F014FCE0   7DDED98B8C74C4CC   942C38AF08D48CB8   CC8267B37434B494
 96 -  99   6BF5459AA32E07B    5E110B45D652D857   B7E3EA6152F29023   EF4DB57D2E92A80F
100 - 103   663ABB65887B8584   3E94B479F41BBDA8   D766055D70BBF5DC   8FC85A410CDBCDF0
104 - 107   C7B48A21EEA02B85   9F1AD53D92C013A9   76E8341916605BDD   2B466B056A0063F1
108 - 111   A731651DCCE94E7A   FF9F3A01B0897656   166DDB2534293B22   4BC384394849060E
112 - 115   86947BB4F0DEF2C8   DE3A24F88CBECAE4   37C8C5DC081E8290   6F669AC0747EBABC
116 - 119   E61194D8D2979737   BEBFCBC4AEF7AF1B   574D2AE02A57E76F   FB375FC5637DF43
120 - 123   479FA59CB44C3936   1F31FA80C82C011A   F6C31BA44C8C496E   AE6D44B830EC7142
124 - 127   271A4AA096055CC9   7FB415BCEA6564E5   9646F4986EC52C91   CEE8AB8412A514BD
128 - 131   9AB30DD984680A4    51056FC1E426B888   B8F78EE56086F0FC   E059D1F91CE6C8D0
132 - 135   692EDFB1BA0FE55B   318080FDC66FDD77   D87261D942CF9503   80DC3EC53EAFAD2F
136 - 139   C8A0EEA5DCD44B5A   900EB1B9A0B47376   79FC509D24143B02   21520F815874032E
140 - 143   A8250199FE9D2EA5   F08B5E8582FD1689   1979BFA1065D5EFD   41D7E0BD7A3D66D1
144 - 147   89801F60C2AA9217   D12E407CBECAAA3B   38DCA15B3A6AE24F   6072FE44460ADA63
148 - 151   E905F05CE0E3F7E8   B1ABAF409C83CFC4   58594E64182387B0   F711786443BF9C
152 - 155   488BC118863859E9   10259E04FA5861C5   F9D77F207EF829B1   A179203C0298119D
156 - 159   280E2E24A4713C16   70A07138D811043A   9952901C5CB14C4E   C1FCCF0020D17462
160 - 163   BC1FCEAFE57208D    536FA3F6823718A1   BA9D42D2069750D5   E2331DCE7AF768F9
164 - 167   6B4413D6DC1E4572   33EA4CCAA07E7D5E   DA18ADEE24DE352A   82B6F2F258BE0D06
168 - 171   CACA2292BAC5EB73   92647D8EC6A5D35F   7B969CAA42059B2B   2338C3B63E65A307
172 - 175   AA4FCDAB988C8B8C   F2E192B2E4ECB6A0   1B137396604CFED4   43BD2C8A1C2CC6F8
176 - 179   8BEAD357A4BB323E   D3448C4BD8DB0A12   3AB66D6F5C7B4266   62183273201B7A4A
180 - 183   EB5F3C6B86F257C1   B3C16377FA926FED   5A3382537E322799   29DDD4F02321FB5
184 - 187   4AE10D2FE029F9C0   124F52339C49C1EC   FBBDB31718E98998   A313EC0B6489B1B4
188 - 191   2A64E213C2609C3F   72CABD0FBE00A413   9B385C2B3AA0BC67   C396033746C0D44B
192 - 195   D7EA8B35465C0F6    55D0F7AF2805F8DA   BC22168BACA5B0AE   E48C4997D0C58882
196 - 199   6DFB478F762CA509   355518930A4C9D25   DCA7F9B78EECD551   8409A6ABF28CED7D
200 - 203   CC7576CB10F70B08   94DB29D76C973324   7D29C8F3E8377B50   258797BF9457437C
204 - 207   ACF099F732BE6EF7   F45EC6B4EDE56DB    1DAC27CFCA7E1EAF   450278D3B61E2683
208 - 211   8D55870E0E89D245   D5FBD81272E9EA69   3CC93936F649A21D   64A7662A8A299A31
212 - 215   EDD068322CC0B7BA   B57E372E50A08F96   5C8CD60AD400C7E2   4228916A860FFCE
216 - 219   4C5E59764A1B19BB   14F0066A367B2197   FDC2E74EB2DB69E3   A5ACB852CEBB51CF
220 - 223   2CDBB64A68527C44   7475E95614324468   9D87087290920C1C   C529576EECF23430
224 - 227   F146484327460DF    57BA3B984E1458F3   BE48DABCCAB41087   E6E685A0B6D428AB
228 - 231   6F918BB8103D0520   373FD4A46C5D30C    DECD3580E8FD7578   86636A9C949D4D54
232 - 235   CE1PBAFC76E6AB21   96B1E5E00A86930D   7F4304C48E26DB79   27ED5BD8F246E355
236 - 239   AE9A55C054AFCEDE   F6340ADC28CFF6F2   1FC6EBF8AC6FBE86   4768B4E4D00F86AA
240 - 243   8F3F4B396898726C   D791142514F84A40   3E63F50190580234   66CDAA1DEC383A18
244 - 247   EFBAA4054AD11793   B714FB1936B12FBF   5EE61A3DB21167CB   6484521CE715FE7
248 - 251   4E3495412C0AB992   169ACA5D506A81BE   FF682B79D4CAC9CA   A7C67465A8AAF1E6
252 - 255   2EB17A7D0E43DC6D   761F25617223E441   9FEDC445F683AC35   C7439B598AE39419
End of Table
```

FIG. 6

Icon Transform Table 3
Table values are in hexadecimal

| Range | Col1 | Col2 | Col3 | Col4 |
|---|---|---|---|---|
| 0 - 3 | 0 | 135661BB3C8D0148 | 26ACC376611A0290 | 35FAA2CD519703D8 |
| 4 - 7 | 4D5986ECC2340520 | 5E0FE757F2B90468 | 6BF5459AA32E07B0 | 78A3242193A306F8 |
| 8 - 11 | 9AB30DD984680A40 | 89E56C62B4E50B08 | BC1FCEAFE57208D0 | AF49AF14D5FF0998 |
| 12 - 15 | D7EA8B35465C0F60 | C4BCEA8E76D10E28 | F146484327460DF0 | E21029F817CB0CB8 |
| 16 - 19 | 375A88FEDB1991CF | 240CE945EB949087 | 11F64B88BA03935F | 2A02A338A8E9217 |
| 20 - 23 | 7A030E12192D94EF | 69556FA929A095A7 | 5CAFCD647837967F | 4FF9ACDF48BA9737 |
| 24 - 27 | ADE985275F719B8F | BEBFB49C6FFC9AC7 | 8B4546513E6B991F | 981327EA0BE69857 |
| 28 - 31 | E0B003CB9D459EAF | F3E66270ADC89FE7 | C61CC0BDFC5F9C3F | D54AA106CCD29D77 |
| 32 - 35 | 6EB511FDB633239E | 7DE3704686BE22D6 | 4819D28BD729210E | 5B4FB330E7A42046 |
| 36 - 39 | 23EC9711740726BE | 30BAF6AA448A27F6 | 5405467151D242E | 161635DC25902566 |
| 40 - 43 | F4061C24325B29DE | E7507D9F02D62896 | D2AADF5253412B4E | C1FCBEE963CC2A06 |
| 44 - 47 | B95F9AC8F06F2CFE | AA09FB73C0E22DB6 | 9FF359BE91752E6E | 8CA53805A1F82F26 |
| 48 - 51 | 59EF99036D2AB251 | 4AB9F8B85DA7B319 | 7F435A750C30B0C1 | 6C153BCE3CBDB189 |
| 52 - 55 | 14B61FEFAF1EB771 | 7E07E549F93B639 | 321ADC99CE04B5E1 | 214CBD22FE89B4A9 |
| 56 - 59 | C35C94DAE942B811 | D00AF561D9CFB959 | E5F057AC8B58BA81 | F6A63617B8D5BBC9 |
| 60 - 63 | 8E0512362B76BD31 | 9D53738D1BFBBC79 | A8A9D1404A6CBFA1 | BBFFB0FB7AE1BEE9 |
| 64 - 67 | DD6A23FB6C66473C | CE3C42405CEB4674 | FBC6E08D0D7C45AC | E89081363DF144E4 |
| 68 - 71 | 9033A517AE52421C | 8365C4AC9EDF4354 | B69F6661CF48408C | A5C907DAFFC541C4 |
| 72 - 75 | 47D92E22E80E4D7C | 548F4F99D8834C34 | 6175ED5489144FEC | 72238CEFB9994EA4 |
| 76 - 79 | A80A8C82A3A485C | 19D6C9751AB74914 | 2C2C6BB84B204ACC | 3F7A0A037BAD4B84 |
| 80 - 83 | EA30AB05B77FD6F3 | F966CABE87F2D7BB | CC9C6873D665D463 | DFCA09C8E6E8D52B |
| 84 - 87 | A7692DE9754BD3D3 | B43F4C5245C6D29B | 81C5EE9F1451D143 | 92938F2424DCD00B |
| 88 - 91 | 7083A6DC3317DCB3 | 63D5C767039ADDFB | 562F65AA520DDB23 | 457904116280DF6B |
| 92 - 95 | 3DDA2030F123D993 | 2E8C418BC1AED8DB | 1B76E3469039DB03 | 82082FDA0B4DA4B |
| 96 - 99 | B3DF3206DA5564A2 | A08953BDEAD865EA | 9573F170B84F6632 | 862590CB8BC2677A |
| 100 - 103 | FE86B4EA18616182 | EDD0D5512B8EC60CA | D82A779C797B6312 | CB7C162749F6625A |
| 104 - 107 | 296C3FDF5E3D6EE2 | 3A3A5E646EB06FAA | FC0FCA93F276C72 | 1C969D120FAA6D3A |
| 108 - 111 | 6435B9339C096BC2 | 7763D888AC846A8A | 42997A45FD136952 | 51CF1BFECD9E681A |
| 112 - 115 | 8485BAF8014CF56D | 97D3DB4331C1F425 | A229798E6056F7FD | B17F183550DBF6B5 |
| 116 - 119 | C9DC3C14C378F04D | DA8A5DAFF3F5F105 | EF70FF62A262F2DD | FC269ED992EFF395 |
| 120 - 123 | 1E36B7218524FF2D | D60D69AB5A9FE65 | 389A7457E43EFDBD | 2BCC15ECD4B3FCF5 |
| 124 - 127 | 536F31CD4710FA0D | 40395076779DFB45 | 75C3F2BB260AF89D | 669593001687F9D5 |
| 128 - 131 | B8E8D4B8B050B37 | ABBEB5003B880A7F | 9E4417CD6A1F09A7 | 8D1276765A9208EF |
| 132 - 135 | F5B15257C9310B17 | E6E733ECF9BC0F5F | D31D9121A82B0C87 | C04BF09A9BA60DCF |
| 136 - 139 | 225BD9628F6D0177 | 310DB8D9BFE0003F | 4F71A14EB7703E7 | 17A17BAFDEFA02AF |
| 140 - 143 | 6F025F8E4D590457 | 7C543E357DD4051F | 49AE9CF82C4306C7 | 5AF8FD431CCE078F |
| 144 - 147 | 8FB25C45D01C9AF8 | 9CE43DFEE0919BB0 | A91E9F33B1069868 | BA48FE88818B9920 |
| 148 - 151 | C2EBDAA912289PD8 | D1BDBB1222A59B90 | E44719DP73329D48 | F711786443BF9C00 |
| 152 - 155 | 1501519C547490B8 | 657302764F991F0 | 33AD92EA356E9228 | 20FBF35105E39360 |
| 156 - 159 | 5858D77096409598 | 4B0EB6CBA6CD94D0 | 7EF41406F75A9708 | 6DA275BDC7D79640 |
| 160 - 163 | D65DC546BD3628A9 | C50BA4FD8DBB29E1 | F0F10630DC2C2A39 | E3A7678BECA12B71 |
| 164 - 167 | 9B0443AA7F022D89 | 885222114F8F2CC1 | BDA880DC1E182F19 | AEFEE1672E952E51 |
| 168 - 171 | 4CBEC89F395B22E9 | 5PB8A92409D323A1 | 6A420BE958442079 | 79146A5268C92131 |
| 172 - 175 | 1B74E73FB6A27C9 | 12E12FC8CBE72681 | 271B8D059A702559 | 344DECBEAAFD2411 |
| 176 - 179 | E1074DB8662FB966 | F2512C0356A2B82E | C7AB8ECE0735BBF6 | D4FDEF7537B8BABE |
| 180 - 183 | AC5BCB54A41BBC46 | BF08AAEF9496BD0E | 8AF20822C501BED6 | 99A46999F58CBF9E |
| 184 - 187 | 7BB44061E247B326 | 68E221DAD2CAB26E | 5D188317835DB1B6 | 4E4EE2ACB3D0B0FE |
| 188 - 191 | 36EDC68D2073B606 | 25BBA73610FEB74E | 104105FB4169B496 | 317644071E495DE |
| 192 - 195 | 6582F74067614A0B | 76D496FB57EB4D43 | 432E343606794E9B | 5078558D36F44FD3 |
| 196 - 199 | 28DB71ACA557492B | 3B8D101795DA4863 | E77B2DAC44D4BBB | 1D21D361F4C04AF3 |
| 200 - 203 | FF31FA99B30B464B | EC679B22D3864703 | D99D39EF821144DB | CACB5854B29C4593 |
| 204 - 207 | B2687C75213F436B | A13E1DCE11B24223 | 94C4BF03402541FB | 8792DBB870A840B3 |
| 208 - 211 | 52D87FBEBC7ADDC4 | 418E1E058CF7DC8C | 7474BCC8DD60DF54 | 6722DD73EDEDDE1C |
| 212 - 215 | 1F81F9527E4ED8E4 | CD798E94EC3D9AC | 392D3A241F54DA74 | 2A7B5B9F2FD9DB3C |
| 216 - 219 | C86B72673812D784 | DB3D13DC089FD5CC | EBC7B1115908D514 | FD91D0AA6985D45C |
| 220 - 223 | 8532F48BFA26D2A4 | 96649530CAABD3EC | A39E37FD9B3CD034 | B0C85646ABB1D17C |
| 224 - 227 | B37B6BDD1506F95 | 18618706E1DD6EDD | 2D9B25CBB04A6D05 | 3ECD447080C76C4D |
| 228 - 231 | 466E605113646AB5 | 553801EA23E96BFD | 60C2A327727E6825 | 7394C29C42F3696D |
| 232 - 235 | 9184EB64553865D5 | 82D28ADF65B5649D | B728281234226745 | A47E49A904AF660D |
| 236 - 239 | DCDD6D88970C60F5 | CF8BC33A78161BD | FA71AEFEF6166265 | E927CF45C69B632D |
| 240 - 243 | 3C6D6E430A49FE5A | 2F3B0FF83AC4FF12 | 1AC1AD356B53FCCA | 997CC8E5BDEFD82 |
| 244 - 247 | 7134E8AFC87DFB7A | 62628914F8F0FA32 | 57982BD9A967F9EA | 44CE4A6299EAF8A2 |
| 248 - 251 | A6DE639A8E21F41A | B5880221BEACF552 | 8072A0ECEF3BF68A | 9324C157DFB6F7C2 |
| 252 - 255 | EB87E5764C15F13A | F8D184CD7C98F072 | CD2B26002D0FF3AA | DE7D47BB1D82F2E2 |

End of Table

FIG. 7

Icon Transform Table 4
Table values are in hexadecimal

| Range | Col1 | Col2 | Col3 | Col4 |
|---|---|---|---|---|
| 0 - 3 | 0 | 73ED3A3BC5C39321 | E7DA74778BB72642 | 94374E4C4E44B563 |
| 4 - 7 | CD887BA2C4C7C9CB | BE65419901045AEA | 2A520FD54F40EF89 | 59BF35EE8A837CA8 |
| 8 - 11 | 992C64085A4616D9 | EAC15E339F8585F8 | 7EF6107FD1C1309B | D1B2A441402A3BA |
| 12 - 15 | 54A41FAA9E81DF12 | 274925915B424C33 | B37E6BDD1506F950 | C09351E6D0C56A71 |
| 16 - 19 | 30645B5D6745A8FD | 43896166A2863BDC | D7B82F2AECC28EBF | A453151129011D9E |
| 20 - 23 | FDEC20FFA3826136 | 8E011AC46641F217 | 1A36548828054774 | 69DB6EB3EDC6D455 |
| 24 - 27 | A9483F553D03BE24 | DAA5056EF8C02D05 | 4E924B22B6849866 | 3D7F711973470B47 |
| 28 - 31 | 64C044F7F9C477EF | 172D7ECC3C07E4CE | 831A308072435lAD | F0F70ABBB78C28C |
| 32 - 35 | 60C8B6BACE8B51FA | 13258C810B48C2DB | 8712C2CD450C77B8 | F4FFF8F680CFE499 |
| 36 - 39 | AD40CD180A4C9B31 | DEADF723CF8F0B10 | 4A9AB96F81CBBE73 | 3977835444082D52 |
| 40 - 43 | F9E4D2B294CD4723 | 8AC09E889510ED402 | 1E3EA6C51F4A6161 | 6DD39CFEDAB9F240 |
| 44 - 47 | 346CA910500A8EE8 | 4781932B95C91DC9 | D3B6DD67DB8DA8AA | A05BB75C1E4E3B8B |
| 48 - 51 | 50ACEDE7A9CEF907 | 2341D7DC6C0D6A26 | B77699902249DF45 | C49BA3ABE78A4C64 |
| 52 - 55 | 9D2496456D0930CC | EEC9AC7EA8CAA3ED | 7AFEE232E68E168E | 913D809234D85AF |
| 56 - 59 | C98089EFF388EFDE | BA6DB3D4364B7CFF | 2E5AFD98780FC99C | 5DB7C7A3BDCC5ABD |
| 60 - 63 | 408F24D374F2615 | 77E5C876F28CB534 | E3D2863ABCC80057 | 903FBC01793B9376 |
| 64 - 67 | C1916D759D16A3F4 | B27C574E58D530D5 | 264B1902169185B6 | 55A62339D3521697 |
| 68 - 71 | C1916D759D16A3F | 7FF42CEC9C12F91E | EBC362A0D2564C7D | 982E589B1795DF5C |
| 72 - 75 | 58BD097DC750B52D | 2B5033460293260C | BF677D0A4CD7936F | CC8A47318914004E |
| 76 - 79 | 953572DF03977CE6 | E6D848E4C654EFC7 | 72EF06A888105AA4 | 1023C934DD3C985 |
| 80 - 83 | F1F5362BFA530B09 | 82180C133F909828 | 162F425F71D42D4B | 65C27864B417BE6A |
| 84 - 87 | 3C7D4D8A3E94C2C2 | 4F9077B1FB5751E3 | DBA739FDB513E480 | A84A03C67OD077A1 |
| 88 - 91 | 68D95220A0151DD0 | 1B34681B65D68EF1 | 8F0326572B923B92 | FCEE1C6CEE51A8B3 |
| 92 - 95 | A551298264D2D41B | D6BC13B9A111473A | 428B5DF5EF55F259 | 316667CE2A966178 |
| 96 - 99 | A159DBCF539DF20E | D2B4E1F4965B612F | 4683AFB8D81AD44C | 356E95831DD9476D |
| 100 - 103 | 6CD1A06D975A3BC5 | 1F3C9A565299A8E4 | 8B0BD41A1CDD1D87 | P8E6EE21D91E8EA6 |
| 104 - 107 | 3B75BFC709DBE4D7 | 4B9885FCCC1877F6 | DFAFCBB0825CC295 | AC42F188479F51B4 |
| 108 - 111 | F5FDC465CD1C2D1C | 8610FE5E08DFBE3D | 1227B012469B0B5E | 61CA8A298358987F |
| 112 - 115 | 913D809234D85AF3 | E2D0BAA9F11BC9D2 | 76E7F4E5BF5F7CB1 | 50ACEDE7A9CEF90 |
| 116 - 119 | 5CB5FB30F01F9338 | 2F58C10B35DC0019 | BB6F8F477B98B57A | C882B57CBE5B265B |
| 120 - 123 | 811E49A6E9E4C2A | 7BFCDEA1AB5DDF0B | EFCB90EDE5196A68 | 9C26AAD620DAF949 |
| 124 - 127 | C5999F38AA5985E1 | B674A5036F9A16C0 | 2243EB4F21DEA3A3 | 51AED174E41D3082 |
| 128 - 131 | 811E49A6E9E4C2A7 | F2F3739D2C275186 | 66C43DD16263E4E5 | 152907EAA7A077C4 |
| 132 - 135 | 4C9632042D230B6C | 3F7B083FE8E0984D | AB4C4673A6A42D2E | D8A17C486367BEDF |
| 136 - 139 | 18322DAEB3A2D47E | 6BDF17957661475F | FFE859D93825F23C | 8C0563E2FDE6611D |
| 140 - 143 | D5BA560C77651DB5 | A6576C37B2A68E94 | 3260227BFCE23BF7 | 418D18403921A8D6 |
| 144 - 147 | B17A12FB8EA16A5A | C29728C04B62F97B | 56A0668C05264C18 | 254D5CB7C0E5DF39 |
| 148 - 151 | 7CF269594A66A391 | F1F53628FA530B0 | 9B281D2EC1E185D3 | E8C52715042216F2 |
| 152 - 155 | 285676F3D4E77C83 | 5BB84CC81124EFA2 | CF8C02845F605AC1 | BC6138BF9AA3C9E0 |
| 156 - 159 | E5DE0D511020B548 | 9633376AD5E32669 | 20479269BA7930A | 71E9431D5E64002B |
| 160 - 163 | E1D6FF1C276F935D | 923BC527B2AC007C | 60C8B6BACE8B51F | 75B1B150692B263E |
| 164 - 167 | 2C5384BEE3AB5A96 | 5FB3BE85266BC9B7 | CB84F0C9682F7CD4 | B869CAF2ADECEFF5 |
| 168 - 171 | 78FA9B147D298584 | B17A12FB8EA16A5 | 9F20EF63F6AEA3C6 | ECCDD558336D30E7 |
| 172 - 175 | B572E0B6B9EE4C4F | C69FDA8D7C2DDF6E | 52A894C132696A0D | 2145AEFAF7AAF92C |
| 176 - 179 | D1B2A441402A3BA0 | A25F9E7A85E9A881 | 3668D036CBAD1DE2 | 4585EA0D0E6E8EC3 |
| 180 - 183 | 1C3ADFE384EDF26B | 6PD7E5D8412E614A | FBE0AB940F6AD429 | 880D91AFCAA94708 |
| 184 - 187 | 489BC0491A6C2D79 | 3B73FA72DFAFBE58 | AF44B43E91EB0B3B | DCA98E055428981A |
| 188 - 191 | 8516BBEBDEABE4B2 | F6FB81D01B687793 | 62CCCF9C552CC2F0 | 1121F5A790EF51D1 |
| 192 - 195 | 408F24D374F26153 | 33621EE8B131F272 | A75550A4FF754711 | D4B86A9F3AB6D430 |
| 196 - 199 | 8D075F71B035A898 | FBEA654A75F63BB9 | 6ADD2B063BB28EDA | 1930113DFE711DFB |
| 200 - 203 | D9A34ODB2EB4778A | AA4E7AEOEB77E4AB | 3E7934ACA53351CB | 4D940E9760F0C2E9 |
| 204 - 207 | 142B3B79EA73BE41 | 67C601422FB02D60 | P3F14F0E61F49803 | 801C7535A4370B22 |
| 208 - 211 | 70EB7F8E13B7C9AE | 30645B5D6745A8F | 97310BF99830EFEC | E4DC31C25DF37CCD |
| 212 - 215 | BD63042CD7700065 | CEBE3E1712B39344 | 5AB9705B5CF72627 | 29544A609934B506 |
| 216 - 219 | E9C71B8649F1DF77 | 9A2A21BD8C324C56 | E1D6FF1C276F935 | 7DF05SCA07B56A14 |
| 220 - 223 | 244F60248D3616BC | 57A25A1F48F5859D | C395145306B130FE | B0782E68C372A3DF |
| 224 - 227 | 20479269BA7930A9 | 53AAA8527FBAA388 | C79DE61E31FE16EB | B470DC25F43D85CA |
| 228 - 231 | EDCFE9CB7EBBF962 | 9E22D3F0BB7D6A43 | A159DBCF539DF20 | 79F8A78730FA4C01 |
| 232 - 235 | B96BF661E03F2670 | CA86CC5A25FCB551 | 5EB182166BB80032 | 2D5CB82DAE7B9313 |
| 236 - 239 | 74E38DC324F8EFBB | 70EB7F8E13B7C9A | 9339F9B4AF7FC9F9 | E0D4C38F6ABC5AD8 |
| 240 - 243 | 1023C934DD3C9854 | 63CEF30F18FF0B75 | P7F9BD4356BBBE16 | 8414877893782D37 |
| 244 - 247 | DDABB29619FB519F | AE4688ADDC38C2BE | 3A71C6E1927C77DD | 499CFCDA57BFE4FC |
| 248 - 251 | 890FAD3C877A8E8D | FAE2970742B91DAC | 6ED5D94B0CFDA8CF | 1D38E370C93E3BEE |
| 252 - 255 | 4487D69E43BD4746 | 376AECA5867ED467 | A35DA2E9C83A6104 | D0B098D20DF9F225 |

End of Table

FIG. 8

METHOD AND SYSTEM FOR GENERATING A TRANSFORM

RELATED APPLICATIONS

This patent application claims priority on provisional patent application 60/240,578 filed on Oct. 13, 2000, entitled "Optimized Coding Methods for Icon Generation and Manipulation in DPP" and assigned to the same assignee as the present application.

FIELD OF THE INVENTION

The present invention relates generally to the field of associative memories, associative processing and polynomial code generation and more particularly to a method and system for generating a transform.

BACKGROUND OF THE INVENTION

Associative memories and associative processing as described in U.S. Pat. Nos. 5,942,002; 5,742,611; 6,157,617: 6,617,400; and U.S. patent application Nos. 09/419,217; 09/672,754; 09/768,102; 09/767,797; 09/768,101; 09/767,493 all assigned to the same assignee as the present application, require transform generators (polynomial code generators). As explained in the above referenced patents (patent applications) a transform (polynomial code) is generated for use in an associative memory. The polynomial generator is generally applied to a key to determine an address (transform, CRC, remainder, code) in a memory where information relating to the key is stored. In the above applications the transform (CRC, remainder) is broken into an address and a confirmer. The confirmer is used to resolve collisions between two distinct items that might otherwise have the same address. In addition to associative memory applications, associative processing applications are described in the above referenced patents (patent applications). Both of these applications require the fast and efficient generation of transforms (polynomial codes). Two general methods of polynomial code generators are known. One is using linear feedback shift registers to perform the division modulo two on a bit by bit basis. There have been some efficiencies realized in the general process, but the basic idea is the same. The other method involves a table lookup process. This method has generally been limited to a byte by byte process. This is because the lookup table for a byte range of number is 256 ($2^8$) entries. If the table were to be expanded for two bytes the number of entries would be 65,536 entries. Obviously a table this large is slow are requires a lot of memory. Despite this there is a need for a two bytes by two bytes process when oriental symbols encoded, such as used in Japan and China. All the potential symbols in these languages cannot be encoded by a single byte. Another use for more than one byte at a time is for computers that now have 64 bit words.

Thus there exists a need for an improved method and system for generating a transform (polynomial code, CRC) that is faster and more efficient than previous systems and methods.

BRIEF DESCRIPTION OF THE DRAWINGS

FIGS. 5–8 are examples of lookup tables that might be used in the system of FIG. 1 in accordance with one embodiment of the invention.

DETAILED DESCRIPTION OF THE DRAWINGS

A system for generating a transform includes a first transform lookup table and second transform lookup table. A transform exclusive OR array is connected to an output of the first transform lookup table and an output of the second transform lookup table. The system allows transforms (polynomial codes, CRCs) to be generated using two or more tables. This means two bytes can be processed at a time without having to use a lookup table with 65,536 entries. Instead, two tables with 256 entries can be used. This is a much more efficient and faster way to calculate a transform.

Figure 1:
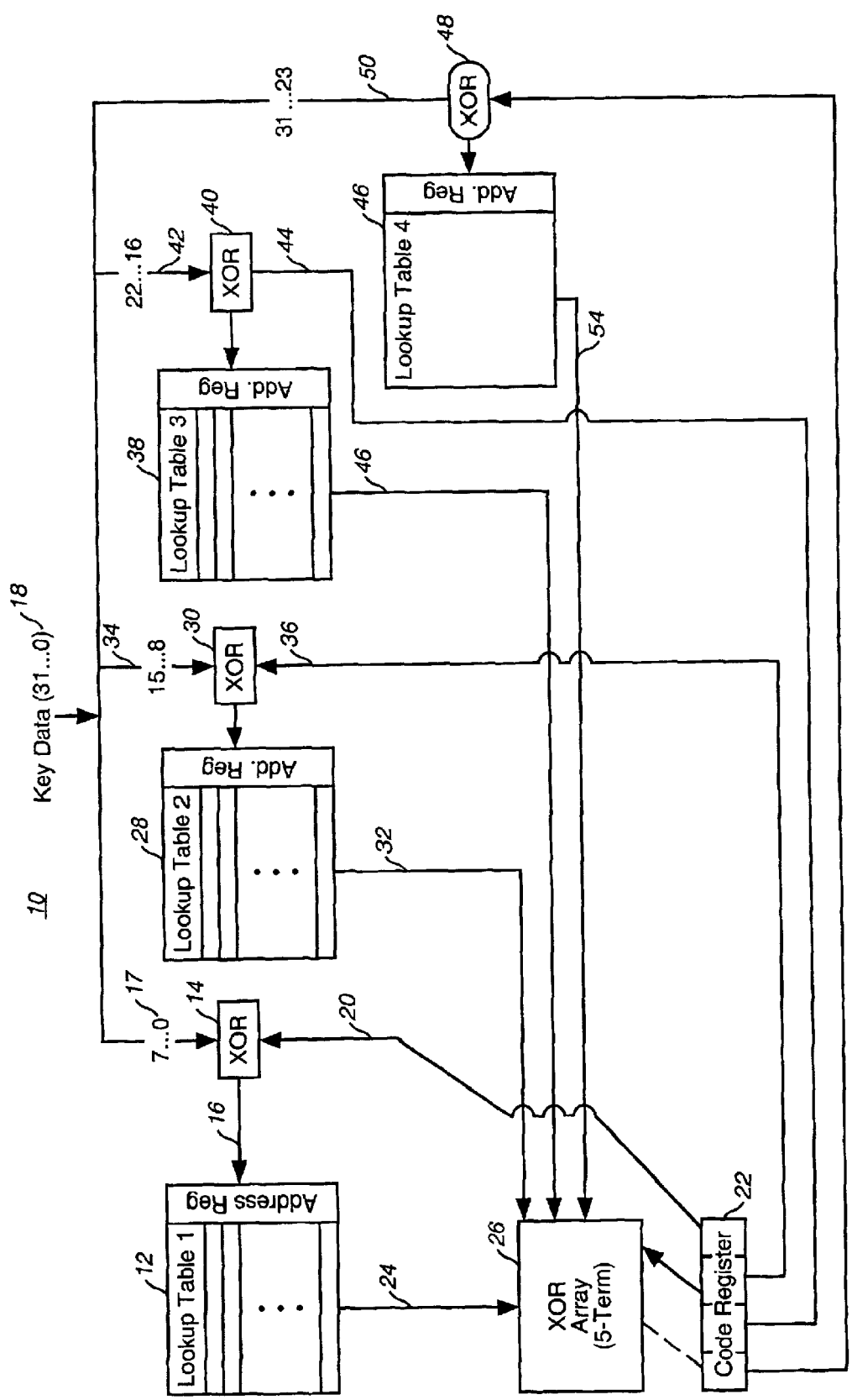
FIG. 1 is a block diagram of a system for generating a transform in accordance with one embodiment of the invention.

FIG. 1 is a block diagram of a system 10 for generating a transform in accordance with one embodiment of the invention. The system has a first lookup table 12 connected to an exclusive OR (first exclusive OR) 14. The output 16 of the exclusive OR is connected to an address register (pointer) of the first lookup table 12. The inputs to the exclusive OR 14 are the first eight bits (byte) 17 of the input data 18 and the least significant byte 20 from the output register. The output 24 of the first lookup table 12 is connected to a transform exclusive OR 26. Note that the term "transform" is used to distinguish this exclusive OR 26 from the other exclusive ORs such as exclusive OR 14.

A second lookup table 28 is connected a second exclusive OR 30. The second exclusive OR 30 has a first input 34 connected to the second byte of input data 18 and a second input 36 connected the second byte of the output register 22. The output 32 of the lookup table 28 is connected to the transform exclusive OR 26. A third lookup table 38 is connected a third exclusive OR 40. The third exclusive OR 40 has a first input 42 connected to the third byte of input data 18 and a second input 44 connected the third byte of the output register 22. The output 46 of the lookup table 38 is connected to the transform exclusive OR 26. A fourth lookup table 46 is connected a fourth exclusive OR 48. The fourth exclusive OR 48 has a first input 50 connected to the fourth byte of input data 18 and a second input 52 connected the fourth byte of the output register 22. The output 54 of the lookup table 46 is connected to the transform exclusive OR 26. The transform exclusive OR 26 is a five term exclusive OR array. The fifth term is the output or code register 22 shifted to the right by 32 bits. In other words the four least significant bytes are discarded and the rest of the transform is shifted four significant bytes less. This shift is equal to the slice of input bits processed.

Using the system 10 up to thirty-two bits of data can be processed into a transform per cycle. Note the process can be iterative, so that any length of data string can be processed four bytes at a time. In addition, it will be apparent to those skilled in the art that the number of tables can be expanded from one table to as many tables as desired. FIGS. 5–8 show an example of four lookup tables generated using the divisor polynomial whose coefficients are:

1E543279765927881 hex

This results in a 64 bit transform (icon, polynomial code). Other transform lengths may also be used. Note one limitation on expanding the system is that the input data length (slice of data) may be no longer than the transform length. Table one 12 is calculated by shifting the first byte range (00-FF hex) by 64 bits (multiplying by $2^{64}$) and determining a transform for every number in the range. Table two 28 is calculated by shifting the first byte range by 64 bits plus 8 bits (multiplying by $2^{72}$). Table three is calculated by shifting the first byte range by 64 bits plus 16 bits (multiplying by $2^{80}$). Table four is calculated by shifting the first byte range by 64 bits plus 24 bits (multiplying by $2^{88}$). The invention is not limited to any particular polynomial divisor, however the divisor's that are irreducible are generally preferable.

As will be apparent to those skilled in the art, the tables could be setup for 4 bit slices or any number of bits. However from a practical stand point it makes sense to have tables based on some multiple of a byte (¼, ½, 1, 2, 4).

Figure 2:
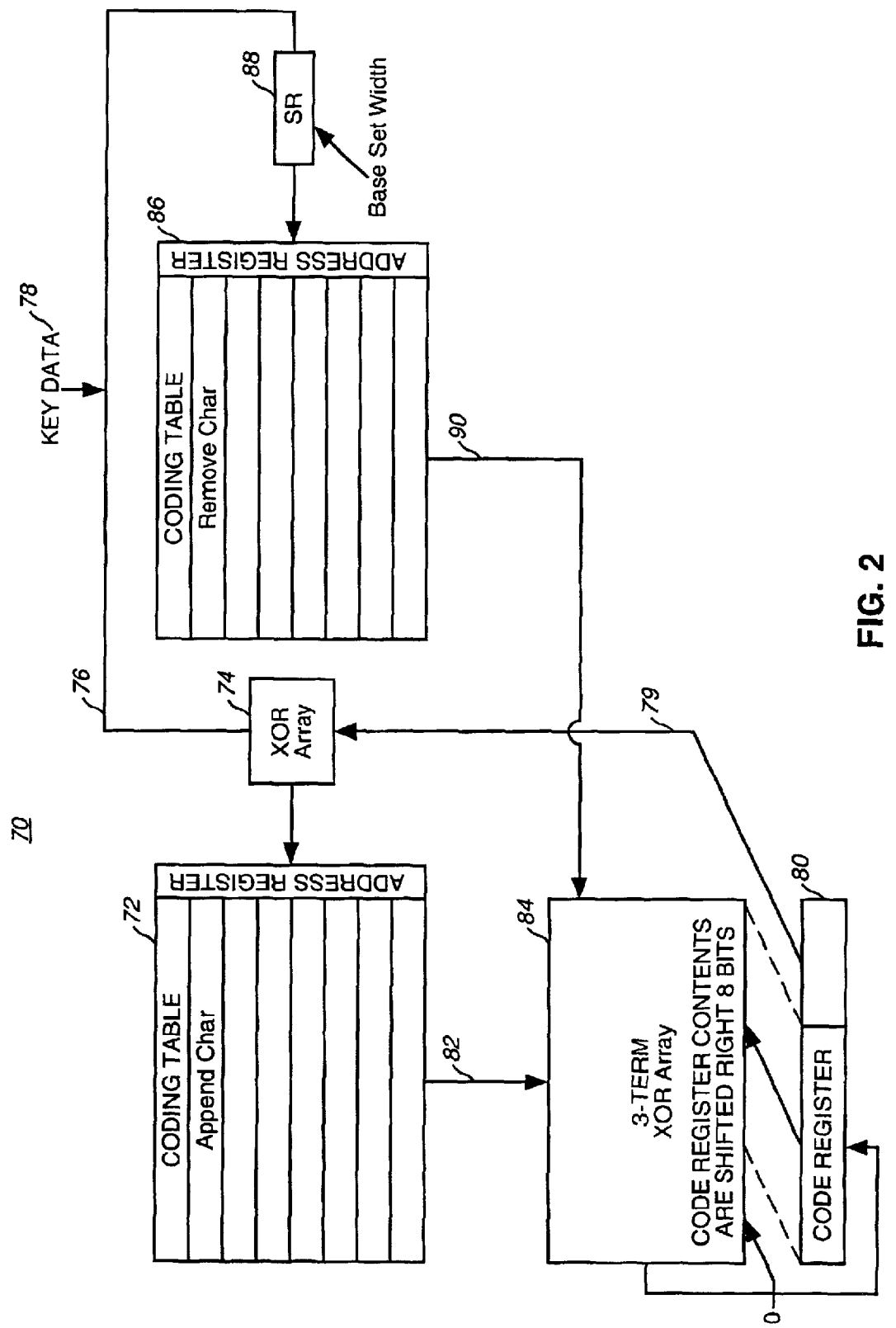
FIG. 2 is a block diagram of a system for generating a transform in accordance with one embodiment of the invention.

FIG. 2 is a block diagram of a system 70 for generating a transform in accordance with one embodiment of the invention. This system is optimized to determine a transform (code, CRC) for a sliding window. For instance if a string of data bytes (EDCBA) is received, the system would determine the transform for AB noted as X(AB), and X(BC), X(CD), X(DE). This is particularly helpful when a user is attempting to perform a search or scan of the incoming data. This application is discussed in more detail in U.S. Pat. No. 6,167,400, entitled "Method of Performing a Sliding Window Search". The system 70 has a first lookup table (append character lookup table) 72 connected to an exclusive OR (data exclusive OR) 74. One input to the data exclusive OR 74 is a new portion 76 of a data string 78 and the second input is connected to a portion 79 (least significant portion) of the present transform (output register) 80. An output 82 of the first lookup table 72 is connected to an exclusive OR array 84. A second lookup table (remove character lookup table) 86 has an input connected to a shift register 88. This effectively connects the second lookup table 86 to a discarded portion of the data string 78. An output 90 of the second lookup table 86 is connected to the exclusive OR array 84. The output register 80 receives the result of the three term exclusive OR array 84 and the output of the output register 80 is shifted right (least significant) by eight bits and input into the exclusive OR array. Note that the amount of shift is equal to the number bits in the new portion 74 and the new portion of data is equal in bits to the discarded portion.

In order to understand how the system 70 works some basic understanding of transform algebra (icon algebra, linear algebra) is required. A more formal treatment of the underlying math can be found in the Appendix of the provisional patent application No. 60/240,578 filed on Oct. 13, 2000, entitled "Optimized Coding Methods for Icon Generation and Manipulation in DPP" and assigned to the same assignee as the present application. The present application claims priority based on this provisional application. Assume we have a data stream (EDCBA), wherein each letter represents a byte of data. Further assume we want to find two byte combinations. The system will then be designed to produces a sliding transform of two bytes: X(AB), X(BC), X(DC) and X(ED). Assume that the output register contains the transform X(AB). Then the least significant eight bits 79 of the transform X(AB) are exclusive ORed 74 with the input data "C". This forms a pointer into the first table 72. If the transform is thirty two bits, then we will represent the output from the append table as $A_1A_2A_3A_4$ and the transform of X(AB) as $T_1T_2T_3T_4$. The transform X(AB) is shifted right by eight bits before being placed in the three term exclusive OR array 84. So this result in 0 $T_1T_2T_3$ being exclusive ORed with $A_1A_2A_3A_4$, where "0" represents a byte of zeros. The result of this exclusive OR operation is the transform X(ABC). This is a well know process used in generating CRCs using a table lookup. The next step is to exclusive OR this transform X(ABC) with the output 90 of the remove character lookup table. In this example the shift register 88 would be two bytes (the same length as the underlying data being transformed). Thus the input to lookup table two 86 is the byte "A". The second lookup table will produce the transform for A00 or X(A00), where the "0" represents a byte of zeros. Next we exclusive OR X(A00) with X(ABC). From transform algebra we know this results in the transform X(BC). For a detailed explanation of the math see the above referenced provisional patent appendix. An informal proof of how this works starts by noting the A XOR A is 0 where "A" and "0" represent bytes of data. Thus X(ABC) is the same thing as X(AX$^{16}$ XOR B X$^{16}$ XOR C), where X$^{16}$ means multiply by $2^{16}$. Then X(A00) XOR X(ABC) is the same thing as X(A00 XOR ABC) or X(0BC) which is X(BC). The reason we can move the arguments inside the transform is because the transform is nothing more than a number of exclusive OR operations.

It is possible to combine the concepts of FIG. 1 with the concepts of FIG. 2 to have two or more append tables (plurality of tables) and have two of more remove tables (plurality of tables). As will be apparent to those skilled in the art, this would requires a larger exclusive OR array 84.

Figure 3:
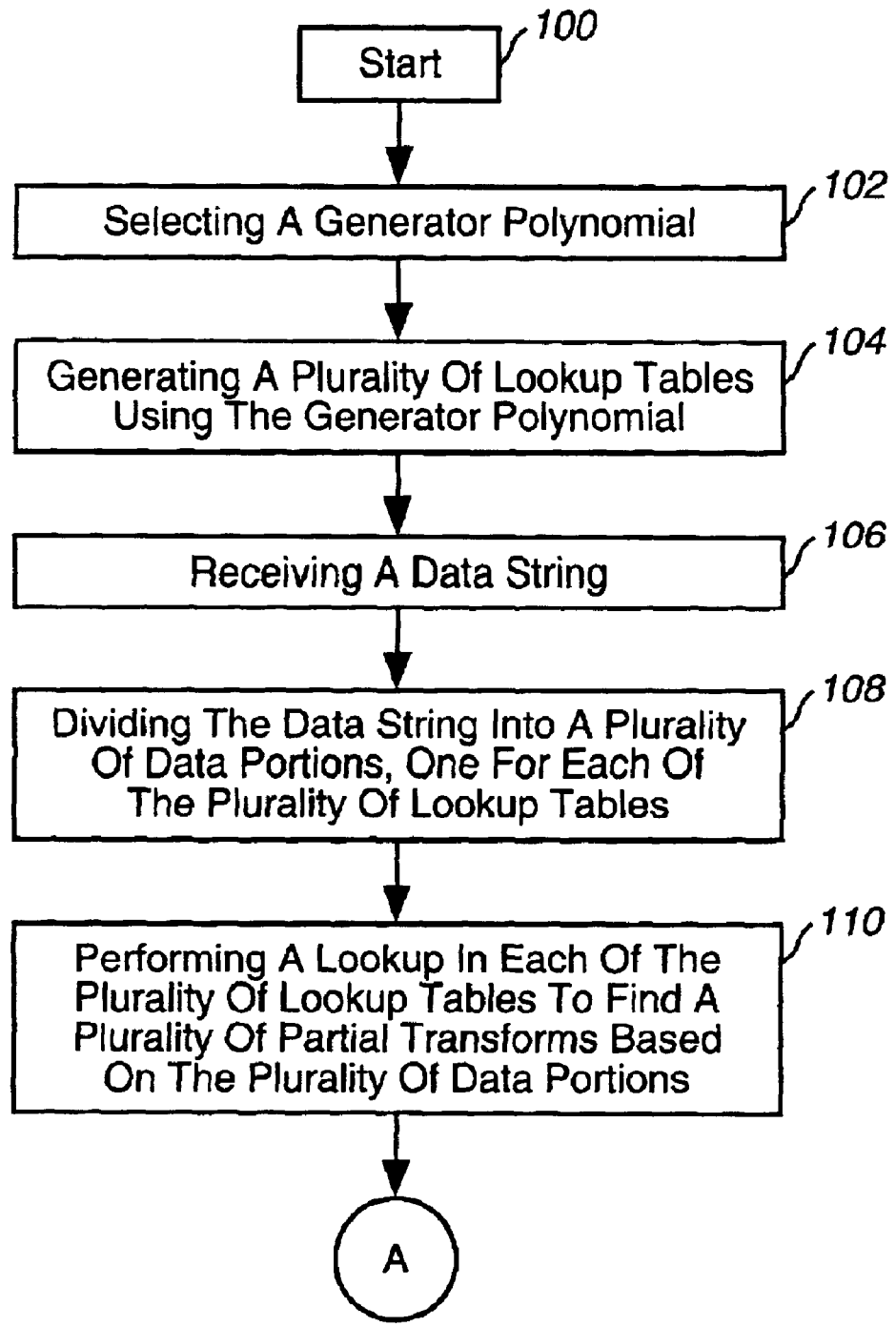
FIGS. 3 & 4 are a flow chart of the steps used in generating a transform in accordance with one embodiment of the invention.
Figure 4:
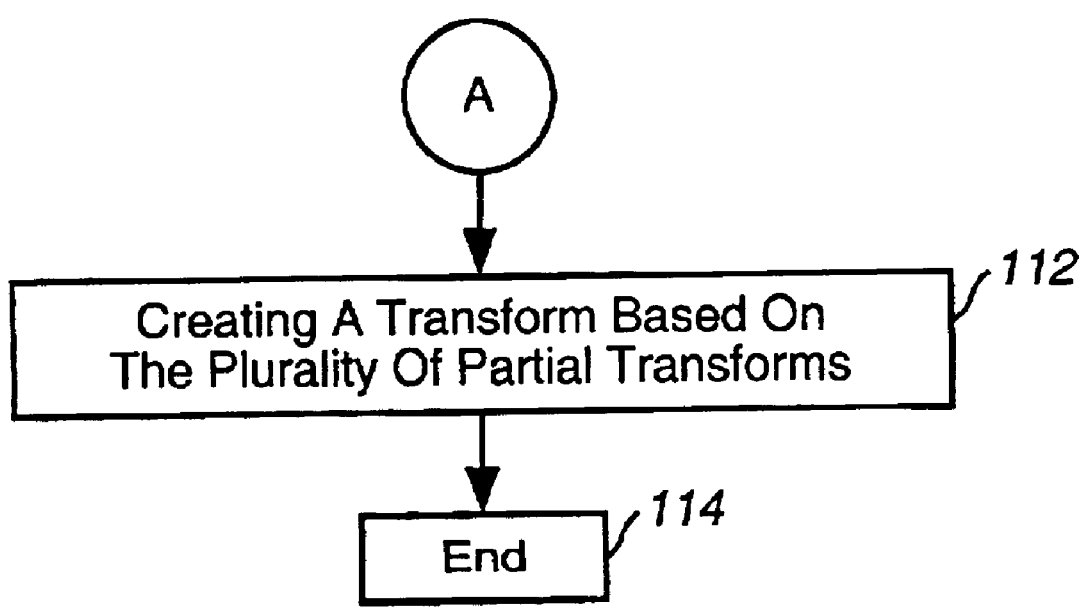

FIGS. 3 & 4 are a flow chart of the steps used in generating a transform in accordance with one embodiment of the invention. The process starts, step 100, by selecting a generator polynomial at step 102. A plurality of lookup tables are generated using the generator polynomial at step 104. A data string is received at step 106. The data string is divided into a plurality of data portions, one for each of the plurality of tables at step 108. A lookup is performed in each of the plurality of lookup tables to find a plurality of partial transforms based on the plurality of data portions at step 110. At step 112, a transform is created based on the plurality of partial transforms which ends the process at step 114. When the data string is longer than the input to the plurality of tables, a second plurality of data portions of the data strings. Each of the second plurality of data portions is exclusive ORed with a portion of the transform to form a plurality of pointers is selected. A lookup is performed in each of the plurality of lookup tables using the plurality of pointers to find a second plurality of partial transforms. The transform is multiplied by a factor to form a moved transform. The moved transform is exclusive ORed with the second plurality of partial transforms to form a new transform. Note the factor that the transform is multiplied by is $2^{-x}$ where x is equal to the number of input bits per iteration. The resulting number is rounded off to a whole number.

In one embodiment the step of generating a plurality of lookup tables includes the step of selecting a range of numbers. Moving the range of numbers by a number of bits equal to the number of bits in the transform to form a shifted range of numbers. Next the shifted range of numbers are divided modulo n (where n is commonly 2) by the generator polynomial to form a plurality of entries for one of the plurality of lookup tables. In one embodiment the range of numbers is a byte of numbers.

Thus there has been described a method and system for creating a transform that is faster and more efficient than previous methods and systems. This increases the efficiency and usefulness of associative memories and associative processing.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A system for generating a transform, comprising:
   a first transform lookup table;
   a second transform lookup table;
   a transform exclusive OR array connected to an output of the first transform lookup table and an output of the second transform lookup table
   a first data exclusive OR array connected to a first data portion of the input data and connected to a first transform portion of an output of the transform exclusive OR array and an output forming a pointer to the first transform table, wherein a number of bits in the first data portion is equal to a number of bits in the first transform portion;
   a second data exclusive OR array connected to a second data portion of the input data and connected to a second transform portion of the output of the transform exclusive OR array and an output forming a pointer to the second transform table, wherein a number of bits in the second data portion is equal to the number of bits in the first data portion;
   a third transform lookup table connected to the transform exclusive OR array; and
   a third data exclusive OR array connected to a third data portion of the input data and connected to a third transform portion of the output of the transform exclusive OR array and an output forming a pointer to the third transform table.

2. A system for generating a transform comprising:
   a first lookup table connected to a new portion of a data string;
   an exclusive OR array having an input connected to an output of the first lookup table wherein the exclusive OR array is a three term exclusive OR array; and
   a second lookup table connected to a discarded portion of the data string.

3. The system of claim 2, wherein the new portion and the discarded portion have the same length.

4. The system of claim 2, further including a data exclusive OR having an output connected to an input of the first lookup table and a first input connected the new portion of the data string and a second input connected to a portion of a present transform.

5. The system of claim 2, further including a shift register connected between a data input stream and the second lookup table.

6. The system of claim 2, further including an output register connected to the output of the exclusive OR array.

7. The system of claim 6, wherein a content of the output register is shifted by a predetermined number of bits and then input into the exclusive OR array.

8. The system of claim 2, wherein the first lookup table is a plurality of tables.

9. The system of claim 8, wherein the second lookup table is a plurality of tables.

* * * * *